United States Patent
Kuntschik et al.

[15] 3,683,024
[45] Aug. 8, 1972

[54] O-POLYALKOXYLATED HIGH MOLECULAR WEIGHT-N-ALKANONE AND N-ALKANAL OXIMES

[72] Inventors: Lawrence F. Kuntschik; Robert S. Edwards, both of Nederland, Tex.

[73] Assignee: Texaco Inc., New York, N.Y.

[22] Filed: June 18, 1968

[21] Appl. No.: 737,866

[52] U.S. Cl............260/566 AE, 44/72, 252/51.5 R, 252/392, 252/548
[51] Int. Cl.............................................C07c 131/00
[58] Field of Search ..............................260/566 AE

[56] References Cited

UNITED STATES PATENTS 3,040,097   6/1962   Bachman et al..........260/566

OTHER PUBLICATIONS

Smith, " Open Chain Nitrogen Compounds" Vol. 2 pp. 40 (1966)
Gaylord, High Polymers Vol. XIII pp. 105– 108 (1963)

Primary Examiner—Leon Zitver
Assistant Examiner—Gerald A. Schwartz
Attorney—K. E. Kavanagh and Thomas H. Whaley

[57] ABSTRACT

There is provided O-polyalkoxylated high molecular weight n-alkanone and n-alkanal oximes corresponding to the formula:

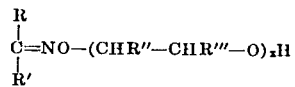

by contacting an n-paraffin oxime with a base, and thereafter reacting the oxime with an oxirane in the substantial absence of water. The high molecular weight n-alkanone and n-alkanal oximes provided herein are useful as nonionic surfactants, as biodegradable detergents, as chemical intermediates in the production of anionic detergents, as lubricating oil additives, and as anti-rust and anti-icing additives in fuels.

1 Claim, No Drawings

O-POLYALKOXYLATED HIGH MOLECULAR WEIGHT-N-ALKANONE AND N-ALKANAL OXIMES

This invention relates to novel 0-polyalkoxylated and substituted 0-polyalkoxylated high molecular weight n-alkanone oximes. In particular, this invention relates to a process for producing 0-polyalkoxylated high molecular weight n-alkanone and n-alkanal oximes by the reaction of an oxirane with $C_{10}$ and higher normal paraffin oximes.

An object of this invention is to provide novel 0-polyalkoxylated high molecular weight n-alkanone and n-alkanal oximes and a process for preparing the same.

Another object of this invention is to provide novel nonionic surfactant materials.

Yet another object of this invention is to provide novel surfactant compounds valuable as nonionic biodegradable detergents.

Other objects and advantages will become apparent from a reading of the following detailed description and examples.

Broadly, this invention contemplates as new compounds 0-polyalkoxylated high molecular weight n-alkanone and n-alkanal oximes corresponding to the formula:

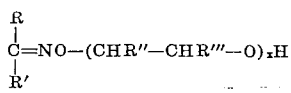

where R and R' are hydrogen or alkyl groups having from one to 11 carbon atoms and where the sum of R and R' equals at least nine carbon atoms and up to 22 carbon atoms, preferably the sum equals from nine to 12 carbon atoms, where R'' and R''' are hydrogen, alkyl groups having from one to five carbon atoms, cycloalkyl, aryl, or alkaryl groups having from six to 20 carbon atoms and where X equals from 2 to 40 and preferably from 6 to 15. Contemplated within the scope of this invention are mixtures of 0-polyalkoxylated high molecular weight n-alkanone and n-alkanal oximes where such compounds are prepared from mixtures of $C_{10}$ to $C_{13}$ or higher n-paraffin oximes.

Illustrative of 0-polyalkoxylated high molecular weight n-alkanone oximes prepared according to the instant invention we mention 0-5'-hydroxy-3'-oxapentyl 2-decanone oxime, 0-5'-hydroxy-3'-oxapentyl 2-undecanone oxime, 0-8'hydroxy-2', 5',8',-trimethyl-3', 6'-dioxaoctyl 6-undecanone oxime, 0-8'-hydroxy-2', 5',8'-triphenyl-3', 6'-dioxaoctyl 6-undecanone oxime, 0-17'-hydroxy-3',6',9',12',15'-pentaoxaheptadecyl ($C_{10}$–$C_{13}$)-n-alkanone oxime and 0-26'-hydroxy-3', 6',9',12',15',18',21',24'-octaoxahexacosyl ($C_{10}$–$C_{13}$)-alkanone oxime. As 0-polyalkoxylated high molecular weight n-alkanal oximes we include 0-17'-hydroxy-3', 6',9',12',15'-pentaoxaheptadecyl ($C_{10}$–$C_{13}$)-n-alkanal oxime and 0-26'-hydroxy-3',6',9',12',15',18',21',24'-octaoxahexacosyl ($C_{10}$–$C_{13}$)-n-alkanal oxime.

According to this invention the contemplated oximes are derived from normal paraffin oximes having at least 10 and up to 23 carbon atoms and preferably from 10 to 13 carbon atoms. Included as starting material we mention 2-decanone oxime, 3-decanone oxime, 4-decanone oxime, 5-decanone oxime, 2-undecanone oxime, 3-undecanone oxime, 4-undecanone oxime, 5-undecanone oxime, 6-undecanone oxime, 2-dodecanone oxime, 4-dodecanone oxime, 6-dodecanone oxime, 2-tridecanone oxime, 3-tridecanone oxime, 5-tridecanone oxime, 7-tridecanone oxime, undecanal oxime, dodecanal oxime and tridecanal oxime along with mixtures thereof. In general, the n-paraffin oximes correspond to the formula:

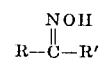

where R and R' are as defined above. Such illustrative normal paraffin oximes contemplated as starting materials and listed above may be prepared, for example, by photochemically reacting in a light transmittable reaction vessel a normal paraffin having 10 or more carbon atoms and up to 23 carbon atoms or a mixture of paraffins having 10 to 13 or more carbon atoms with a gaseous nitrosating agent such as nitrosyl halide, nitrosyl sulfuric acid or a mixed nitrosating agent such as nitric oxide and chlorine under a nitrosating agent partial pressure of at least 125 mm Hg. Further, the photochemical reaction is conducted under the influence of light excluding wave-lengths below 200 millimicrons such that high molar yields of oxime, up to 92 percent or higher, may be realized. Reaction temperatures of from 32° to 110° F. have been found to be applicable and the conversion product comprises approximately 95 percent of the n-paraffin oxime salt of, for example, hydrochloric acid which in turn is converted to the paraffin oxime by neutralization with a base such as aqueous ammonia or caustic soda. Separation of the oxime during neutralization is materially aided by employing a low boiling hydrocarbon exemplified by cyclohexane and pentane such that the inorganic salts from neutralization are carried along in an aqueous phase with the low boiling hydrocarbon carrying along the oxime. The oximes may be recovered subsequently by evaporation of the hydrocarbon. The illustrative procedure described above for preparing normal paraffin oximes is described in co-pending application No. 674,612 filed Oct. 11, 1967 by Orville W. Rigdon et al. assigned to the assignee hereof and is hereby incorporated by reference.

Alternatively, the normal paraffin oxime may be prepared by any of the widely known classical procedures. In particular, oxime preparation by the reaction of alkanals and alkanones with hydroxylamines under appropriate conditions is generally applicable.

More specifically, the process of this invention comprises reacting a normal paraffin oxime, as hereinabove provided and defined, in the presence of catalytic amounts of a base with an oxirane. Illustrative of the catalysts contemplated in the instant invention we include oxides, hydroxides and alkoxides of the metal of groups IA and IIA of the periodic table exemplified by sodium hydroxide, sodium ethoxide, sodium phenoxide, potassium hydroxide, potassium ethoxide, potassium phenoxide, lithium hydroxide and lithium ethoxide. Oxime salts of the metals of groups IA and IIA, whether prepared in situ or separately, are similarly contemplated. Additional catalytic materials appropriate to this reaction include basic nitrogen compounds illustrated by amines such as triethylamine, diethylmethylamine, dimethylethylamine and metal salts of triethanolamine.

In practice, the normal paraffin oxime is contacted with catalytic amounts of base, generally in amounts of from 0.001 to 1.0 equivalents of base per mole of normal paraffin oxime. The catalyst and oxime are intimately mixed in an inert atmosphere whereby trace amounts of water are eliminated from the system as by purging the system with an inert gas such as dry nitrogen at about 100°C. or at reduced pressure and at a correspondingly reduced temperature. Thereafter the oxirane is added to the substantially anhydrous environment such that from 2 to 40 and preferably from 6 to 15 moles of oxirane are added per mole of normal paraffin oxime, at a rate of from 0.01 to 5 moles per hour of oxirane per mole of n-paraffin oxime. Appropriate reaction temperatures range from about 0° to 300°C. and we prefer to conduct the reaction at from about 20° to 160°C. under pressures ranging from subatmospheric to 100 psig. The reaction time is normally between 1 and 24 hours although longer and shorter periods may be employed.

The oxiranes contemplated as starting materials correspond to the formula:

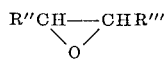

where $R''$ and $R'''$ are as previously defined. Illustrative of the materials falling within the above formula we mention oxirane, methyloxirane, ethyloxirane, 2,3-dimethyloxirane, phenyloxirane, 2-methyl-3-phenyloxirane and cyclohexyloxirane.

An important aspect of this invention centers about conducting the reaction in the substantial absence of water. To successfully provide the designated 0-polyalkoxylated high molecular weight n-alkanone and n-alkanal oximes in high yields with minimal amounts of polyalkylene glycols, a substantially anhydrous reaction medium is necessary such that water is present in an amount not exceeding 0.5 weight percent, and preferably not exceeding 0.1 weight percent. The presence of substantial amounts of water cause the oxirane to polymerize as, for example, the polymerization of oxirane to form polyethylene glycols. However, the desired characteristics and uses of the product will govern the permissible level of water within the limits specified above and ultimately the amount of glycol in the product. While such non-aqueous environments as triethylamine, diethylmethylamine, dimethylethylamine, dioxane and tetrahydrofuran may be employed as reaction diluents, we in fact prefer to undertake the reaction of the normal paraffin oxime and the oxirane in the absence of added diluents. In a preferred embodiment, the reactants themselves constitute the reaction medium. Moreover, the reaction medium may be composed of mixed $C_{10}$ to $C_{13}$ normal paraffin oximes along with mixtures of oxiranes. In another embodiment, the precursor n-paraffin oximes are provided as a crude oxime starting material such that the material contains from 90 percent and higher normal paraffin oximes along with lesser amounts of ketones. When operating with crude oximes starting materials, the polyalkoxylated higher molecular weight n-alkanone or n-alkanal oxime product is recovered in high purity and yield by employing such techniques as thin film evaporation of the reaction product such that ketones, unreacted oximes and low molecular weight monoalkoxylated or polyalkoxylated oximes are removed. Thin film evaporation utilizing for example a Turba-Film Processor, is accomplished by distributing the product on the heated walls of an evaporator such that low boiling compounds are quickly vaporized and condensed. Short residence times are customarily employed to minimize product decomposition. In practice, the weight percent recovery of the final product has exceeded 90 percent and is in most instances 98 percent or better.

The novel polyalkoxylated high molecular weight n-alkanone and n-alkanal oximes prepared according to the instant invention are useful as biodegradable nonionic surfactants and detergents, and chemical intermediates in the production of anionic detergents. These products are also useful as lubricating oil additives and as anti-rust and anti-icing additives in fuels.

Polyethoxylated $C_{10}$–$C_{13}$ oximes exhibit detergency properties generally similar to other polyethoxylated compounds containing similar hydrophilic groups. When agitated in water the polyethoxylated $C_{10}$–$C_{13}$ oximes produce voluminous amounts of foam that subsequently requires several water rinses for complete removal. The formation of stable emulsions of water, mineral oil and polyethoxylated oximes further demonstrates the utility of these compounds as detergents.

In order to more fully illustrate the nature of our invention and manner of practicing the same the following examples are presented.

EXAMPLE I 22.981 kilograms of mixed $C_{10}$–$C_{13}$ n-paraffins were charged to a photoreactor and reacted with nitrosyl chloride under the influence of light excluding wavelengths below 200 millimicrons at 60°F. The gaseous NOCl and HCl was charged at the rate of 1.64 grams per minute and at 0.95 grams per minute respectively, to produce crude oximes at the rate of 1.83 grams per minute. After separation of the crude oxime-acid salt, that acid was neutralized with aqueous ammonia and the crude $C_{10}$–$C_{13}$ oxime was separated. The molar selectivity to crude oximes was 87.4 percent with an overall recovery of 90.7 weight percent. The crude oxime product contained 1–2 weight percent $C_{10}$–$C_{13}$ ketones.

93.0 grams (0.5 mole) of the crude oxime prepared above along with 2.0 grams of sodium hydroxide pellets were added to a 1 liter rocker bomb. The bomb was purged with nitrogen and closed. Subsequently, the rocker was started and the bomb heated to 120°C. for a period of 1.25 hours and the reactor contents were twice purged with nitrogen at 120°C. Thereafter, 132 grams (3.0 moles) of oxirane were added over a period of 4.1 hours at a rate such that the pressure was maintained below 100 psig. Rocking was continued for 0.8 hour and the reactor was thereafter cooled to a temperature of 70°F. and again purged with nitrogen. Product in the amount of 202 grams, corresponding to a weight percent recovery of 90.2 percent, was obtained. The elemental analysis based on weight percent found: carbon 61.2, hydrogen 9.9, nitrogen 3.1, and oxygen 25.8. Product analysis by nuclear magnetic resonance indicated completely ethoxylated oximes with a long polyethylene oxide chain. The product obtained was designated 0-17'-hydroxy-3',6',9',12',15', 5'-pentaoxaheptadecyl-($C_{10}$–$C_{13}$)-n-alkanone oximes.

EXAMPLE II

The crude $C_{10}$–$C_{13}$ oximes, 93.0 grams (0.5 mole), as prepared in example I were reacted with 203 grams (4.5 moles) of oxirane in accordance with the procedure outlined in example I and 292 grams of product were recovered where the weight percent recovery equaled 98.0 percent. The elemental analysis based on weight percent found: carbon 58.9, hydrogen 9.6, nitrogen 2.2 and oxygen 29.3. Product analysis by nuclear magnetic resonance indicated a highly ethoxylated oxime and was identified as 0-26'-hydroxy-3',6',9',12',15',18',21',24'-octaoxahexacosyl-($C_{10}$–$C_{13}$)-n-alkanone oximes.

191.0 grams of 0-26'-hydroxy-3',6',9',12',15',18',21',24'-octaoxahexacosyl ($C_{10}$–$C_{13}$)-n-alkanone oximes (containing approximately 3 weight percent ketones and small amounts of the corresponding aldehyde oximes) was charged to a 2" Thin Film Evaporator heated to 100°C. at 0.02–0.03 mm Hg. The charge rate was varied from 36–102 milliliters per hour during the 4 hour evaporation period. The dry ice trap condensate (4.4 weight percent of charge) contained primarily entrained solvent carried over from the photonitrosation neutralization step and ketones, while the distillate (9.16 weight percent of charge) contained about 10–15 weight percent ketones in low molecular weight 0-ethoxylated and 0-polyethoxylated oximes. The residue thus collected (84.5 weight percent charge) contained < 1 percent ketones.

The above procedure was repeated at 150°C. and 0.20 mm Hg charging the above residue (152.6 grams). A distillate (9.17 weight percent of charge) composed of intermediate molecular weight 0-polyethoxylated oximes and a residue (90.5 weight percent of charge) composed of high molecular weight 0-polyethoxylated oximes were separated.

EXAMPLE III

Crude $C_{10}$–$C_{13}$ oximes, 93.0 grams (0.5 mole), as prepared in example I were reacted with 360 grams (3.0 moles) of phenyloxirane in accordance with the procedure outlined in example I. 441.0 grams of product were recovered where the weight percent recovery equaled 97.2. Product elemental analysis based on weight percent was: carbon–54.6; hydrogen–18.1; nitrogen–3.1; and oxygen (by difference)–24.2. The product was designated as 0-17' hydroxy-2',5',8',11',14',17'-hexaphenyl-3',6',9',12',15'pentaoxaheptadecyl ($C_{10}$–$C_{13}$)-n-alkanone oximes.

EXAMPLE IV

Preparation of 2-undecanone oxime was accomplished by refluxing for 12 hours 2-undecanone 173 grams of hydroxylammonium chloride, 194 milliliters of pyridine and 2 liters of anhydrous ethanol. After removing the alcohol under vacuum, the residue was cooled and diluted with 5 volumes of cold water. The crude 2-undecanone oxime was separated by filtration after cooling in an ice bath. The crystals were cold water washed, recrystallized from 95 percent alcohol and dried under vacuum.

93.0 grams (0.5 mole) of 2-undecanone oxime and 0.94 gram of sodium hydroxide pellets were added to a 1 liter rocker bomb. The bomb was purged three times with nitrogen, and closed. Thereafter the rocker was started and the bomb heated to 120° C. for a period of approximately 1.3 hour. Thereafter, the reactor was evacuated and again purged three times with nitrogen at 120°C. Subsequently, 44 grams (1.0 mole) of oxirane was slowly added over a period of 5.4 hours at a rate such that the pressure was maintained below 30 psig. After 0.7 hour the reactor was cooled and purged with nitrogen. 138.0 grams of reaction product was recovered corresponding to a weight percent of 100. The elemental analysis on a weight percent basis found: carbon 70.1, hydrogen 11.9, nitrogen 4.1 and oxygen 14.9. Product analysis by nuclear magnetic resonance indicated completely ethoxylated oxime and the product was identified as 0-5'-hydroxy-3'-oxapentyl-2-undecanone oxime.

WE CLAIM:
1. 0-5'-hydroxy-3'-oxapentyl 2-undecanone oxime.

* * * * *